US010754010B2

(12) United States Patent
Hinderling et al.

(10) Patent No.: US 10,754,010 B2
(45) Date of Patent: Aug. 25, 2020

(54) LASER DISTANCE MEASURING MODULE HAVING POLARIZATION ANALYSIS

(71) Applicant: HEXAGON TECHNOLOGY CENTER GMBH, Heerbrugg (CH)

(72) Inventors: Jürg Hinderling, Marbach (CH); Thomas Piok, Koblach (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 402 days.

(21) Appl. No.: 15/820,418

(22) Filed: Nov. 21, 2017

(65) Prior Publication Data

US 2018/0156895 A1 Jun. 7, 2018

(30) Foreign Application Priority Data

Nov. 22, 2016 (EP) ..................................... 16200115

(51) Int. Cl.
| | | |
|---|---|---|
| *G01S 7/48* | (2006.01) | |
| *G01S 7/481* | (2006.01) | |
| *G01S 17/36* | (2006.01) | |
| *G01N 21/64* | (2006.01) | |
| *G01C 3/02* | (2006.01) | |
| *G01S 17/08* | (2006.01) | |

(Continued)

(52) U.S. Cl.
CPC .............. *G01S 7/4811* (2013.01); *G01C 3/02* (2013.01); *G01N 21/6445* (2013.01); *G01S 7/487* (2013.01); *G01S 7/499* (2013.01); *G01S 17/08* (2013.01); *G01S 17/36* (2013.01); *G01S 17/42* (2013.01)

(58) Field of Classification Search
CPC ......................................................... G01C 3/08
See application file for complete search history.

(56) References Cited

U.S. PATENT DOCUMENTS

| | | | | |
|---|---|---|---|---|
| 4,333,008 | A | 6/1982 | Misek | |
| 2005/0264813 | A1* | 12/2005 | Giakos | B82Y 20/00 356/369 |
| 2013/0229643 | A1* | 9/2013 | Moeller | G01C 15/004 356/4.01 |

FOREIGN PATENT DOCUMENTS

| | | |
|---|---|---|
| DE | 39 30 272 A1 | 4/1990 |
| DE | 10 2013 207 148 A1 | 11/2013 |

(Continued)

OTHER PUBLICATIONS

Guasta et al., "Use of polarimetric lidar for the study of oriented ice plates in clouds", Applied Optics, vol. 45, Issue 20, Jul. 10, 2006, pp. 4878-4887.

(Continued)

*Primary Examiner* — Luke D Ratcliffe
(74) *Attorney, Agent, or Firm* — Maschoff Brennan

(57) ABSTRACT

A distance measuring method and an electronic laser distance measuring module, for determining a distance to a target object, wherein the transmitted signal is emitted with selected polarization states by a transmitting unit of the laser distance measuring module. The transmitted signal is emitted and the received signal is acquired such that a polarization identifier of the polarization state of the transmitted signal adheres to the received signal and an evaluation of the received signal is derived based on the polarization identifier, to take into consideration multiple reflections during the processing of the received signal to determine the distance.

16 Claims, 6 Drawing Sheets

(51) Int. Cl.
      *G01S 17/42*     (2006.01)
      *G01S 7/487*    (2006.01)
      *G01S 7/499*    (2006.01)

(56) References Cited

FOREIGN PATENT DOCUMENTS

| | | |
|---|---|---|
| DE | 10 2015 200 027 A1 | 7/2016 |
| EP | 1 079 239 A1 | 2/2001 |
| EP | 1 832 897 B1 | 11/2010 |

OTHER PUBLICATIONS

Tan and Stoker, "Multiwavelength Polarimetric Lidar for Foliage Obscured Man-Made Target Detection", Advances in Geoscience and Remote Sensing, chapter 18, Jan. 1, 2009, pp. 391-406.
European Search Report dated May 24, 2017 received in Application No. 16200115.

\* cited by examiner

LASER DISTANCE MEASURING MODULE HAVING POLARIZATION ANALYSIS

CROSS-REFERENCE TO RELATED APPLICATIONS

This application claims priority to European Patent Application No. 16200115.0 filed on Nov. 22, 2016. The foregoing patent application are incorporated herein by reference.

FIELD OF THE INVENTION

The present invention relates to a distance measuring method and an electronic laser distance measuring module, in particular for use in a handheld distance measuring device, laser scanner, profiler, laser tracker, or tachymeter, for determining a distance to a target object, wherein selected polarization states are emitted by a transmitting unit of the laser distance measuring module. In this case, the transmitted signal is emitted and the received signal is acquired such that a polarization identification of the polarization state of the transmitted signal can be derived, to take into consideration multiple reflections during the processing of the received signal to determine the distance.

Various principles and methods are known in the field of electronic and/or electrooptical distance measurement. One approach is to emit pulsed electromagnetic radiation, for example, laser light, onto a target to be measured and subsequently to receive an echo from this target as a backscattering object, wherein the distance to the target to be measured can be determined, for example, on the basis of the runtime, the shape, and/or the phase of the pulse. Such laser distance meters have become widespread over time in many fields as standard solutions.

Two different approaches or a combination thereof are usually used for detecting the backscattered pulse.

In the so-called threshold value method, a light pulse is detected when the intensity of the radiation incident on a detector of the distance measuring device used exceeds a certain threshold value. This threshold value prevents noise and interfering signals from the background from being incorrectly detected as a useful signal, i.e., as backscattered light of the emitted pulse.

The other approach is based on the sampling of the backscattered pulse. This approach is typically used in the case of weak backscattered signals (for example, pulse signals), as are caused, for example, by a greater measurement distances, or in general for an increase of the measurement accuracy. An emitted signal is detected by sampling the radiation acquired by a detector, identifying a signal within the sampled range, and finally chronologically determining a location of the signal. By using a plurality of sampling values and/or summation of the received signal synchronous with the emission rate, a useful signal can also be identified under unfavorable circumstances, so that even greater distances or background scenarios which are noisy or subject to interference can be managed.

Presently, the entire waveform of the analog signal of the radiation acquired by a detector is sampled in this case by means of the waveform digitizing (WFD) method. After identification of the coding of the associated transmitted signal (ASK, FSK, PSK, etc.) of a received signal, a signal runtime ("pulse runtime") is determined very accurately from a defined extension point of the sampled, digitized, and reconstructed signal, for example, the inflection points, the curve maxima, or integrally by means of an optimum filter known from time interpolation.

Alternatively or additionally to determining the pulse runtime, (rapid) sampling is often also performed with respect to pulses or pulse sequences coded or modulated in amplitude, phase, polarization, wavelength, and/or frequency.

In the approach of the chronologically very precise sampling of the backscattered signal, the electrical signal generated by the detector is converted by means of an analog-digital-converter (ADC) into a digital signal sequence. This digital signal is usually subsequently further processed in real time. In a first step, the signal, often modulated as a pulse, is recognized by special digital filters and finally its location within the signal sequence is determined. By using a plurality of sampled pulse sequences, a useful signal can also be identified under unfavorable circumstances, so that even greater distances or background scenarios which are noisy or subject to interference can be managed.

One of the simplest types of modulation is the identification of the individual pulses or the pulse sequences via interval coding as described, for example, in EP 1 832 897 B1. It is used, for example, for the purpose of re-identification capability. This recognition is required, for example, if ambiguity arises, which can be induced in the runtime measurement of pulses by different situations, for example, if more than one pulse or one pulse group is located between measuring device and target object.

The target object for a distance measurement can be in this case, on the one hand, natural surfaces of objects such as house walls, roads, windows, objects provided with a coat of paint, matte or glossy metal surfaces, and the like. On the other hand, however, target panels such as retroreflective films or corner cubes can also be used as the target object.

When measuring surfaces using a laser beam, the light is differently scattered and reflected depending on the optical properties and the mechanical composition. In the case of rough or matte surfaces, the light is scattered uniformly in all directions according to Lambert's law. In the case of surfaces having gloss, a substantial part is reflected in the mirroring direction, and in the case of surfaces having texture, complex backscatter patterns having high intensity can result.

Since the backscattering primarily does not occur—even in the case of surfaces having Lambertian scattering behavior—in the direction of the distance measuring device, the probability is very high that the scattered or reflected light will be incident on a further surface and experience backscattering again. Multiple reflections impair the distance measurement. In general, a distance measuring device is therefore designed in such a manner that a receiving device of the distance measuring device only has a very small field of vision, whereby radiation reflected multiple times is no longer in the field of vision of the distance measuring device.

However, there are arrangements and shapes of objects which are to be measured, in which the problem of multiple reflections still causes interference even with a very small field of vision of the receiving unit. These are, inter alia, in particular edges or corners where two surfaces meet. A part of the reflected radiation is scattered twice close to the corners and in the corner itself and is acquired by the receiving unit of the distance meter. If at least one of the two walls also has a coat of paint, for example, the multiple reflection then becomes dominant. In particular also wet surfaces, for example, wet roads, can result in interfering multiple reflections, which find the path back into the receiving unit of the measuring device.

Objects which are metallic or manufactured from plastic fundamentally tend toward mirroring reflection. For example, if a pipe made of such a material is scanned, the coordinates of the measuring points are thus often incorrect.

In laser scanning, for example, the implicit assumption is often made that the laser beam as soon it is incident on the surface of the object to be measured, and the region seen by the measuring device only receives radiation scattered one time. Other beam components, which do not originate directly from the point of incident on the object, have heretofore been neglected.

The result of multiple reflections are artifacts in the ascertained point clouds, in particular when measuring objects having partial gloss such as metal parts or windowpanes. The artifacts contain walls reflected in windowpanes, a distorted shape of planes in corners, foreign objects reflected via glossy pipes or handrails in the angle direction of the laser beam, etc.

Retroreflective objects occupy a special position. They do generate a triple reflection, but reflect the light at the precise angle back to the measuring device. An undesired second surface is thus not irradiated and the distance measurement is correct in consideration of the zigzag path in the retroreflective material. This distance offset is referred to as the addition constant of the retroreflective target object.

Measures for a compensation of artifacts caused by multiple reflections in the scope of a distance measurement are presently little-known. Modern distance meters which are based on the principle of waveform digitization (WFD) can detect, for example, the distortion of the signal or pulse shape which results due to overlapping multiple reflections or multiple targets. In the event of such occurrences, in general the result of the distance measurement is discarded.

In the case of multiple reflections in which the distance between respective associated distance values is greater than the width of the waveform of a single reflection signal, the two distance values associated with the targets are output. However, it is not certain whether the ascertained distances are correct, in this case there could also be an additional light path—for example, reflected on a wet road—which is not recognized as a multiple reflection. Multiple reflections, which do not represent a real radial distance in relation to the measuring device, can also remain unrecognized in the case of reflections on windowpanes.

Devices are also known which suppress certain multiple reflections, for example, wherein multiple reflections are suppressed which are reflected back to the optical receiving unit at an angle which is steeper than the receiving angle of the measuring device (FOV). Thus, signals are only received which have a beam angle within the field of vision (FOV). The problem of multiple reflections remains within the receiving field of vision, however. Present distance meters typically have a field of vision of 1 to 2 millirads.

Scanners having a rapidly rotating laser beam often have a still larger field of vision, as the field of vision of the receiving unit is rotated together with the transmitted beam. This has the disadvantage that during the runtime of the laser pulse to the target object and back, the field of vision of the receiving unit progressively rotates further and therefore no longer looks in the direction of the pulse to be received. The field of vision of the receiving unit either has to be dimensioned having sufficiently large angle range or a so-called derotation is required, as is found in textbooks. In particular modern scanners having a rapid scanning unit (>50 Hz) and/or which measure distances greater than 100 m, nonetheless require a large receiving spatial angle, however.

BRIEF DESCRIPTION OF THE INVENTION

It is therefore an object of some embodiments of the invention to provide an improved distance measurement, which at least recognizes artifacts of multiple reflections and thus automatically suppresses flawed distance measurements.

One special object of some embodiments of the invention is additionally to provide a measuring process in which distance errors due to multiple reflections are compensated for and therefore improved distance measurement accuracy is enabled.

These objects are achieved by the implementation of the characterizing features of independent claims. Features which refine the invention in an alternative or advantageous manner can be inferred from the dependent claims.

Some embodiments of the invention relate to a distance measuring method, in particular for a laser distance measuring device, especially designed as a handheld distance measuring device, laser scanner, profiler, laser tracker, or tachymeter, for determining a distance to a target object comprising emitting a transmitted signal, in particular a pulsed signal series; receiving at least parts of the transmitted signal reflected on the target object as the received signal; and processing the received signal to derive the distance to the target object therefrom, in particular wherein the determination of the distance is based on the pulse runtime method.

According to some embodiments of the present invention, the transmitted signal is emitted in a defined polarization state, in particular wherein at least one polarization identifier of the polarization state of the transmitted signal is known, especially the value of at least one Stokes parameter and/or a polarization direction. The transmitted signal is furthermore emitted and the received signal is acquired such that a polarization identifier of the polarization state of the transmitted signal adheres to the received signal, wherein the polarization identifier is selected so that it is an indication for whether the received signal originates from a single reflection or a multiple reflection of the transmitted signal, wherein an evaluation of the received signal is derived based on the polarization identifier, which is taken into consideration during the processing of the received signal to determine the distance to the target object.

A polarization identifier can describe, for example, an intensity of the radiation—as a function of the wavelength—measured using at least one polarizing filter, for example, a radiation component having a defined polarization direction, for example, with respect to a measurement using a linearly polarized filter, or a radiation component measured using a circular polarization filter. A polarization identifier can also describe the degree of the (total) polarization, a degree of the linear and/or circular polarization component, a polarization angle, values of one or more Stokes parameters, or the complete Stokes vector.

In one special embodiment, the transmitted signal is emitted as substantially completely linearly or circularly polarized radiation.

A general, pure polarization state can also be, however, a coherent superposition of these simple polarization states. These pure polarization states are often described by means of the Jones vector formula. In contrast, partially polarized radiation represents a mixture in the meaning of a static ensemble of independently polarized radiation components. The characterization of these incoherent polarization states can be described using the so-called Stokes vector. The degree of polarization of the emitted radiation and in particular of the received radiation is often slightly less than 100%, since a pure polarization state is only settable with difficulty. Slight deviations from a 100% polarization are usually negligible for many applications, however, for example, as a result of a given measurement accuracy of an employed polarimeter structure.

A core concept of some embodiments of the invention is thus based on detecting multiple reflections via a polarization state and/or a polarization modification, whereby incorrect measurements are recognized and remedied.

There are various options for producing partially or completely polarized radiation from unpolarized radiation. Upon each reflection on a dielectric boundary layer (i.e., for example, on a glass pane), a partial polarization results. The reason for this is in the Fresnel equations. The reflection factor is strongly dependent on the angle of incidence, the refractive indices of the media, and the polarization, so that one of the two polarization directions has occurred more strongly in the reflected beam.

In particular for rough surfaces, the influence of the polarization can be complex.

As long as unpolarized radiation is scattered on a surface, a scattered beam also contains, in addition to an unpolarized component, a component of polarized radiation, since the reflectivity is in general also polarization-dependent for microstructured boundary surfaces.

If a surface is irradiated using polarized radiation, the polarized beam is then typically partially depolarized, i.e., the degree of polarization decreases. The rule of thumb typically applies that the depolarization increases with increasing surface roughness and irregularity. The microscopic multiple scattering processes in the case of very rough surfaces can be assumed, for example, as the illustrative reason.

Diverse depolarization processes are known in the scope of the invention, for example, a laser beam—for example, of a laser scanner—passes over the rough surface of a target object, whereby new regions are progressively irradiated and the backscattering is thus chronologically varied in polarization and amplitude during a measurement and integrally depolarized.

The finite spectral breadth of the laser results, together with the optical path differences of the rough surface, in further depolarization of the detected radiation and the spatial averaging over multiple orders of diffraction of the reflected radiation at the detector itself further reduces the degree of polarization.

Metals have a complex index of refraction and the Fresnel reflection curves differ from the dielectric materials. Instead of the Brewster angle, for example, there is the main angle, at which the reflectivity of the p polarization (transverse magnetic, "parallel" polarized radiation) is minimal and greater than zero. Upon reflection of light, the electromagnetic field additionally experiences a phase rotation, so that the electromagnetic field vector describes an ellipse.

Experience has shown that smooth surfaces display a stronger directly reflected component, while in contrast rough surfaces reflect back in the entire half space. Moreover, in the case of smooth surfaces, the substantial difference between s reflectivity (transverse electrical, "perpendicularly" polarized radiation) and p reflectivity (transverse magnetic, "parallel" polarized radiation) is clear, for example, on the basis of the Fresnel equations.

The scattering behavior over the angle is also different for the s and p polarization in the case of high roughnesses, however. The s polarization typically scatters somewhat more strongly and displays a residual specular peak in the vicinity of the gloss angle to be expected. The depolarization in the diffuse scattered light component is therefore not complete.

In addition to the mechanism of depolarization, the mechanism of partial polarization is furthermore to be taken into consideration. Partial polarization refers to unpolarized light being incident and predominantly being reflected in a specular manner. However, if measurement is performed using a polarized laser source, the specular reflections primarily differ with respect to the intensity.

Furthermore, upon an interaction of radiation with a material surface, in addition to the effects of polarization and depolarization, the effects of diattenuation and retardance (delay) are also to be taken into consideration. Diattenuation is understood as the different transmission or reflection for the respective polarization direction, for example, in the case of a polarizer. The retardance describes the difference between the associated phase shifts of the two characteristic polarizations upon the transmission or reflection of radiation.

The polarization state of partially coherent light can be described, for example, using the four Stokes variables (S1, S2, S3, S4). In this case, S1 describes the total beam intensity as the sum of both polarizations, S2 substantially describes the linearly-perpendicularly polarized component, S3 describes the linearly polarized component rotated by 45°, and S4 substantially describes the circularly polarized component.

The polarization state is described using the S1-scaled variables S2, S3, and S4, wherein a differentiation is typically made between total degree of polarization (DOP, "degree of polarization", 100% for completely polarized radiation, 0% for unpolarized radiation), degree of linear polarization (DOLP), and degree of circular polarization (DOCP):

$$DOP = \frac{\sqrt{S_2^2 + S_3^2 + S_4^2}}{S_1}$$

$$DOLP = \frac{\sqrt{S_2^2 + S_3^2}}{S_1}$$

$$DOCP = \frac{S_4}{S_1}$$

A further key figure is the angle of polarization (AOP), whereby the rotational angle of the polarization direction or the polarization ellipse is described:

$$AOP = \frac{1}{2} \cdot \mathrm{atan}\left(\frac{S3}{S2}\right)$$

The intensity of the reflected radiation can be divided into an incoherent superposition of a completely polarized component and an unpolarized component, for example, by the following decomposition:

$$S = \begin{bmatrix} S_1 \\ S_2 \\ S_3 \\ S_4 \end{bmatrix} = \begin{bmatrix} DOP*S_1 \\ S_2 \\ S_3 \\ S_4 \end{bmatrix} + \begin{bmatrix} (1-DOP)S_1 \\ 0 \\ 0 \\ 0 \end{bmatrix}$$

Upon scattering on surfaces which are neither double-refracting nor metallic, it is often sufficient for recognizing multiple reflections to observe the degree of linear polarization DOLP and possibly the angle of polarization AOP. In the case of multiple scatterings on rough surfaces or reflection on multiple surfaces and also on metals, phase shifts occur between the x and y components of the electromagnetic field, which changes the degree of circular polarization DOCP.

The laser light is thoroughly polarized, the partial polarization upon the interaction with the object surface is therefore not relevant for laser light. Moreover, the analysis of the polarization states of the radiation scattered from the target object is thus simplified.

The Stokes variables describe the total received power (S1), the depolarization (1-DOP), and the shape (ellipticity) and location (azimuth) of the polarization ellipse and therefore also the mutual phase shift of the two transverse electromagnetic field vector components of the polarized light component.

The four Stokes variables (S1, S2, S3, S4)—also called Stokes parameters—are typically summarized in a vector ("Stokes vector") and the interactions with surfaces, transparent bodies, and metals can be described using Müller matrices. The Müller calculus describes the four interactions diattenuation, retardance, polarization, and depolarization, which can occur in the case of single and multiple scattering. The scattering process is thus reduced to a single Müller matrix. The Müller matrix elements may be determined by a number of provided input Stokes vectors and measured output Stokes vectors, whereby inferences can be derived about the scattering nature of the radiation path.

Stokes vectors of the backscattered radiation may be determined, for example, using polarization filter arrangements and various methods exist for determining the Stokes parameters.

For example, a measurement of the backscattered radiation can be performed in at least four steps, i.e., a measurement without filter, with a first linear polarizer (linearly-polarized filter), with a linear polarizer rotated by 45° in relation to the first linear polarizer, and with a circular polarization filter (circular polarizer, for example, a right-circular polarization filter). Circular polarizers are linear polarizers having an additional quarter-wave delay layer. The four Stokes parameters may be derived therefrom:

$S1=I_1\_I_p+I_s,\ S2=I_p-I_s,\ S3=I_{+45}-I_{-45},\ S4=S_R-S_L.$

The four intensity measurements can be carried out in succession or in parallel, for example, by means of four detectors.

Another method is to use a rotating phase delay plate, for example, a quarter-wave delay plate, having a polarizer—typically called an analyzer—in front of the detector. During the rotation of the plate, the received power is measured after the analyzer and the Stokes vector is determined by means of a transformation derived from the Müller matrices, in particular from frequency, phase, and amplitude of the signal generated using the phaseplate.

So-called Stokes cameras are also known, wherein the required polarization filters are arranged in a matrix structure above the pixels, whereby the cameras also register the polarization state of the received radiation in addition to the intensity image. A Stokes camera often does not sufficiently solve the problem of multiple reflection, however, since the measuring beam of the distance measuring unit has a slightly different beam path in relation to the camera pixels because of parallaxes and different alignment.

In the case of spectrally narrowband radiation or with the aid of spectral filters, for example, diffraction gratings, polarimeters based on the principle of the Savart plate interferometer, the Wollaston polarimeter, or also the Sagnac interferometers are also suitable for efficient beam analysis, i.e., general measurements, wherein the polarization states are divided by means of a double-refractive material, in particular of a polarization modulator, for example, based on an acoustooptical or electrooptical delay element, and/or a polarizing beam splitter, and are conditioned by further elements such as phase plates and analyzers and supplied to photodetectors or cameras.

In a further embodiment, the received signal is additionally analyzed by means of waveform digitization, in particular to identify or resolve multiple signals in the received signal due to multiple reflections of the transmitted signal on multiple targets.

The distance measuring technology WFD enables the measurement of multiple targets. If the associated distances of two simultaneously irradiated target objects are sufficiently far apart from one another, the acquired signal pulses are thus chronologically separable in a receiving unit, but are not yet unambiguously resolved. For example, reflections can occur on metal pipes or windowpanes, wherein target objects, which are undesired, are reflected in the spatial measuring direction. In contrast, if the received pulse is distorted or broadened with respect to its signal form, the double targets thus cannot be resolved with sufficient accuracy and the measurement is discarded.

In particular, an arrangement of beam divergences is ideal, for example, such that a receiving unit has an FOV angle which is precisely equal to the divergence of an emitted laser beam as a carrier of the emitted transmitted signal. In this arrangement, remaining interfering multiple reflections can be recognized by means of the WFD principle due to possible distortions of the signal form, for example, a pulse broadening.

The dimensioning of equal divergences of transmitter and receiver is primarily suitable for slow scanning movements and measurements over short distances. In the case of long distances or rapid scanning movements, in contrast, the divergence of the receiver typically has to be set larger. This can be performed, for example, by parameter input of a user, wherein corresponding positioning elements have to be provided in an employed EDM module.

A further embodiment of the invention accordingly relates to the received signal being analyzed by means of waveform digitization, wherein the transmitted signal is emitted having a defined beam divergence and the received signal is acquired using a receiving unit such that the receiving unit has a field of vision angle which is identical to or less than the beam divergence of the transmitted signal.

For example, by means of WFD analysis, typically objects which are less than 1 m but more than 3 cm away from one another can be detected via a pulse broadening signature and marked. Therefore, for example, angled target objects are recognized, in which two adjoining surfaces have similar backscattering. An angled surface in which one surface reflects strongly cannot be recognized by pulse broadening, in contrast.

The knowledge about a polarization identifier can be utilized here, since, for example, in the case of metallic surfaces or surfaces having strong gloss such as pipes, at which the laser beam reflects away and is incident on a white wall, the degree of polarization DOP is very high (>65%). The reflective surface may thus be identified.

For example, an identification of a multiple reflection can be derived on the basis of a measured power ratio between two emitted polarization states, in particular by means of two complementary or orthogonal polarization states, for example, linearly polarized radiation in each of the x and y directions or left-polarized and right-polarized radiation.

In one embodiment, the transmitted signal is emitted, for example, as a transmitted signal sequence of individual partial signals, wherein the polarization state of individual partial signals is changed in the scope of the determination of the distance according to a defined chronological sequence, in particular wherein a chronological polarization sequence of individual completely polarized partial signals is generated, especially wherein the polarization sequence comprises two completely linearly polarized partial signals orthogonal in relation to one another or two completely circularly polarized partial signals orthogonal in relation to one another.

In the case of single reflections on smooth surfaces and microscopic multiple reflections on rough surfaces, the received intensities ($I_x$, $I_y$) associated with the x and y polarized emissions are almost equal. In contrast, if the measured power ratio $I_x/I_y$ or $S1_x/S1_y$ exceeds a specific threshold value (for example, by a factor of 3), multiple scattering from more than one surface or a surface having structure, for example, a brushed metal surface, is thus to be presumed.

A further embodiment of the invention is characterized in that a first partial signal of the transmitted signal is emitted as completely linearly polarized radiation or completely circularly polarized radiation, a second partial signal of the transmitted signal is emitted as completely polarized radiation having a polarization state orthogonal in relation to the first partial signal, at least parts of the first partial signal reflected on the target object are acquired as the first received partial signal and at least parts of the second partial signal reflected on the target object are acquired as the second received partial signal, a first intensity of a part of the first received partial signal is measured, a second intensity of a part of the second received partial signal is measured, based on the first intensity and the second intensity, a first comparison value is derived, in particular an intensity ratio, a degree of polarization (DOP), a degree of linear polarization (DOLP), or a degree of circular polarization (DOCP), and the first comparison value is taken into consideration for an evaluation of the first and/or second received partial signal, in particular for an identification or a resolving of multiple signals in the first and/or second received partial signal by multiple reflections of the first and/or second partial signal on multiple targets.

For example, the first partial signal is emitted as linearly polarized radiation having a defined polarization direction and the second partial signal is emitted as linearly polarized radiation having a polarization direction rotated by 90° in relation to the polarization direction of the first partial signal. Alternatively, for example, the first partial signal can be emitted as a circularly polarized beam, for example, right-circular, and the second partial signal can be emitted as an opposing circularly polarized beam (here, for example, left-circular).

In a further embodiment, in addition a third partial signal of the transmitted signal is emitted as completely linearly polarized radiation or completely circularly polarized radiation, a fourth partial signal of the transmitted signal is emitted as completely polarized radiation having a polarization state orthogonal in relation to the third partial signal, at least parts of the third partial signal reflected on the target object are acquired as the third received partial signal and at least parts of the fourth partial signal reflected on the target object are acquired as the fourth received partial signal, a third intensity of a part of the third received partial signal is measured using a first polarization analyzer, a fourth intensity of a part of the fourth received partial signal is measured using a second polarization analyzer, based on the third intensity and the fourth intensity, a second comparison value is derived, in particular an intensity ratio, a degree of polarization (DOP), a degree of linear polarization (DOLP), or a degree of circular polarization (DOCP), and the second comparison value is taken into consideration for an evaluation of the third and/or fourth received partial signal, in particular for an identification or a resolving of multiple signals in the third and/or fourth received partial signal due to multiple reflections of the third and/or fourth partial signal on multiple targets.

In particular, the first and/or second comparison value is compared, for example, to a first and/or second threshold value based on a set of defined scattering properties representative of at least one target object, based on at least one element of the following group: a geometrical surface structure; a surface porosity; albedo properties; reflection properties; absorption properties; and phase properties.

In the case of multiple reflections via multiple surfaces, the received light powers $I_x/I_y$ are often strongly different, but experiments have shown that the two parameters are not sufficient in many cases. For a robust identification of multiple reflections, a further analysis is therefore often necessary, for example, a complete polarization analysis and ascertainment of the complete or partial polarization state of the received radiation.

For example, the radiation backscattered from the target can be measured via at least two, four, or a higher number of redundant intensity measurements using polarization and phase elements connected upstream of the receiving unit in sequential or parallel arrangement, from which, for example, the four components of the Stokes vector can be derived. The receiving unit can be equipped as in a distance meter with an avalanche photodetector (APD) or an SiPM array detector (silicon photomultiplier), but also with a photodiode array or a CCD or CMOS camera.

Depending on the acquired complete or partial polarization state or a polarization identifier typical for a polarization state, for example, an intensity ratio with respect to specific polarization directions, the measurement result of the distance measurement can be judged and an evaluation of the received radiation can be performed.

For example, in the case of reflective surfaces, the degree of polarization (DOP) of the laser is maintained, for example, in each case proceeding from a high degree of polarization of practically 100%, as generated by laser diodes or other lasers. The degree of polarization of the received radiation is correspondingly high in the case of reflective surfaces, for example, metallic surfaces or retroreflectors consisting of glass beads or triple mirror structures (for example, DOP=65-100%).

In the case of reflective objects, in contrast, the risk exists that because of the reflected beam component, more than one surface is measured. This can be checked, for example, by means of use of a WFD distance meter. If only one received pulse is present in the registered and chronologically recorded signal, the reflective surface is thus identified and the risk of an incorrect measurement is low. In the case of two different signal returns, the probability is high that the signal having the smaller amplitude can be assigned to the reflective surface, since reflective surfaces have a lower scattered light component. Furthermore, for example, on essentially clean or dust-free windowpanes, no signal or only a very weak signal is to be expected.

A reliable assignment of the degree of polarization typically requires a time-resolved polarization analysis in the picosecond range. Time-resolved polarimetry can be implemented, for example, using APDs and associated time measuring circuits, wherein a distance measurement is carried out on each Stokes channel.

In a further embodiment of the invention, therefore at least one polarization identifier of the transmitted signal is known, in particular the value of at least one Stokes parameter; at least one polarization identifier of the received signal is derived, in particular the value of the at least one Stokes parameter; and based on the at least one polarization identifier of the transmitted signal and/or the at least one polarization identifier of the received signal, at least one evaluation parameter of the following group is derived: a degree of polarization (DOP) of the received signal, in particular the degree of linear (DOLP) and/or circular polarization (DOCP); an angle of polarization of the received signal; a depolarization factor between transmitted signal and received signal, in particular as a function of the albedo of the target object; wherein the at least one evaluation parameter is taken into consideration for the evaluation of the received signal during the processing of the received signal to determine the distance to the target object, in particular wherein a time-resolved progress of the at least one evaluation parameter is generated.

For example, for certain standard cases, multiple reflections can be identified and/or analyzed on the basis of defined limiting values for the degree of polarization and/or the angle of polarization, in particular depending on the application and possible specific scattering surfaces for the application.

Matte surfaces are often distinguished, for example, in that the degree of polarization DOP of the originally completely polarized beam is strongly reduced after the scattering on these surfaces. This is the case in particular for matte surfaces having only slight residual gloss.

Furthermore it is possible, for example, on the basis of defined DOP ranges which are specific to certain surfaces, to differentiate matte surfaces with and without gloss, or to differentiate scattering at nearly perpendicular angle of incidence from scattering at perpendicular angle of incidence or scattering at slightly inclined angles of incidence.

Even in the case of inclined incidence greater than 45° on rough surfaces, the degree of polarization DOP is typically small and in a range specific to the surface. Moreover, in the case of inclined incidence greater than 45°, metals and rough surfaces tend toward elliptical polarization of the backscattered radiation, wherein the Stokes component S4 and therefore the degree of circular polarization DOCP increases.

In particular with a very small degree of polarization, for example, with DOP<15%, multiple reflections having path differences of <30 mm can be included (path differences of >30 mm are typically already identified by means of WFD). This follows, for example, obviously therefrom, if a depolarization of 50% is assumed here for illustration for a single scattering, from which, for example, after a triple scattering on identical surfaces and identical angles of incidence, a degree of polarization of $0.5^3=0.125$ follows.

In particular for measured degrees of polarization of DOP=2%-10%, multiple targets are usually well recognizable, wherein the shape of the polarization ellipse is typically substantially maintained, especially wherein by means of s or p incident radiation, the alignment of the polarization ellipse is typically also maintained. In the case of linearly-polarized incident radiation having a direction of polarization rotated by 45° in relation to the s or p incident radiation, in contrast, the ellipse opens, i.e., S4 becomes greater than zero and the reflected radiation tends toward circularly polarized radiation having a degree of circular polarization DOCP>0.

Some embodiments of the invention furthermore relate to a distance measuring module, in particular for use in a laser distance measuring device, especially designed as a hand-held distance measuring device, laser scanner, profiler, laser tracker, or tachymeter, for determining a distance to a target object using a transmitting unit for emitting a transmitted signal, in particular a pulsed signal series; a receiving unit for receiving at least parts of the transmitted signal reflected on the target object as a received signal; and a monitoring and control unit for processing the received signal to derive the distance to the target object therefrom.

According to some embodiments of the present invention, the transmitting unit is designed such that the transmitted signal is emitted in a defined polarization state, in particular wherein at least one polarization identifier of the polarization state of the transmitted signal is known, especially the value of at least one Stokes parameter and/or a polarization direction, and the transmitted signal is emitted and the received signal is acquired such that a polarization identifier of the polarization state of the transmitted signal adheres to the received signal, wherein the polarization identifier is selected so that it is an indication for whether the received signal originates from a single reflection or a multiple reflection of the transmitted signal, and an evaluation of the received signal is derived by the monitoring and control unit based on the polarization identifier, wherein the evaluation of the received signal is taken into consideration during the processing of the received signal to determine the distance to the target object.

In a further embodiment, the transmitting unit is designed such that the transmitted signal is emitted as substantially completely linearly or circularly polarized radiation.

In a further embodiment, the transmitting unit is designed such that the transmitted signal is emitted as a transmitted signal sequence of individual partial signals, wherein the polarization state of individual partial signals is changed in the scope of the determination of the distance according to a defined chronological sequence, in particular wherein a chronological polarization sequence of individual completely polarized partial signals is generated, especially wherein the polarization sequence comprises two completely linearly polarized partial signals orthogonal in relation to one another or two completely circularly polarized partial signals orthogonal in relation to one another.

In one special embodiment, the monitoring and control unit is designed such that the received signal is analyzed by means of waveform digitization, in particular wherein the transmitted signal is emitted with a defined beam divergence and the received signal is acquired using a receiving unit such that the receiving unit has a field of vision angle, which is identical to or less than the beam divergence of the transmitted signal.

In particular, the distance measuring module is designed such that a first partial signal of the transmitted signal is emitted as completely linearly polarized radiation or completely circularly polarized radiation, a second partial signal of the transmitted signal is emitted as completely polarized radiation having a polarization state orthogonal in relation to the first signal, at least parts of the first partial signal reflected on the target object are acquired as the first received partial signal and at least parts of the second partial signal reflected on the second target object are acquired as the second received partial signal, a first intensity of a part of the first received partial signal is measured, a second intensity of a part of the second received partial signal is measured, based on the first intensity and the second intensity, a first comparison value is derived, in particular an intensity ratio, a degree of polarization (DOP), a degree of linear polarization (DOLP), or a degree of circular polarization (DOCP), and the first comparison value is taken into consideration for an evaluation of the first and/or second received partial signal, in particular for an identification or a resolving of multiple signals in the first and/or second received partial signal due to multiple reflections of the first and/or second partial signal on multiple targets.

In a further embodiment, the distance measuring module is designed such that a third partial signal of the transmitted signal is emitted as completely linearly polarized radiation or completely circularly polarized radiation, a fourth partial signal of the transmitted signal is emitted as completely polarized radiation having a polarization state orthogonal in relation to the third partial signal, at least parts of the third partial signal reflected on the target object are acquired as the third received partial signal and at least parts of the fourth partial signal reflected on the target object are acquired as the fourth received partial signal, a third intensity of a part of the third received partial signal is measured using a first polarization analyzer, a fourth intensity of a part of the fourth received partial signal is measured using a second polarization analyzer, based on the third intensity and the fourth intensity, a second comparison value is derived, in particular an intensity ratio, a degree of polarization (DOP), a degree of linear polarization (DOLP), or a degree of circular polarization (DOCP), and the second comparison value is taken into consideration for an evaluation of the third and/or fourth received partial signal, in particular for an identification or a resolving of multiple signals in the third and/or fourth received partial signal due to multiple reflections of the third and/or fourth partial signal on multiple targets.

The first and/or second comparison value can especially be compared, for example, to a first and/or second threshold value, based on a set of defined scattering properties representative of at least one target object, based on at least one element of the following group: a geometrical surface structure; a surface porosity; albedo properties; reflection properties; absorption properties; and phase properties.

In a further embodiment, the distance measuring module is designed such that at least one polarization identifier of the transmitted signal is known, in particular the value of at least one Stokes parameter; at least one polarization identifier of the received signal is derived, in particular the value of the at least one Stokes parameter; and, based on the at least one polarization identifier of the transmitted signal and/or the at least one polarization identifier of the received signal, at least one evaluation parameter of the following group is derived from: a degree of polarization (DOP) of the received signal, in particular the degree of linear (DOLP) and/or circular (DOCP) polarization; an angle of polarization of the received signal; a depolarization factor between transmitted signal and received signal, in particular as a function of the albedo of the target object; wherein the at least one evaluation parameter is taken into consideration for the evaluation of the received signal during the processing of the received signal to determine the distance to the target object, in particular wherein a time-resolved progress of the at least one evaluation parameter is generated.

The distance measuring method according to some embodiments of the invention and the distance measuring module according to the invention will be described in greater detail hereafter, solely by way of example, on the basis of exemplary embodiments schematically illustrated in the drawings. Identical elements are identified with identical reference signs in the figures. The described embodiments are generally not shown to scale and they are also not to be understood as a restriction.

BRIEF DESCRIPTION OF THE DRAWINGS

In the specific figures

DETAILED DESCRIPTION

Figure 1A:
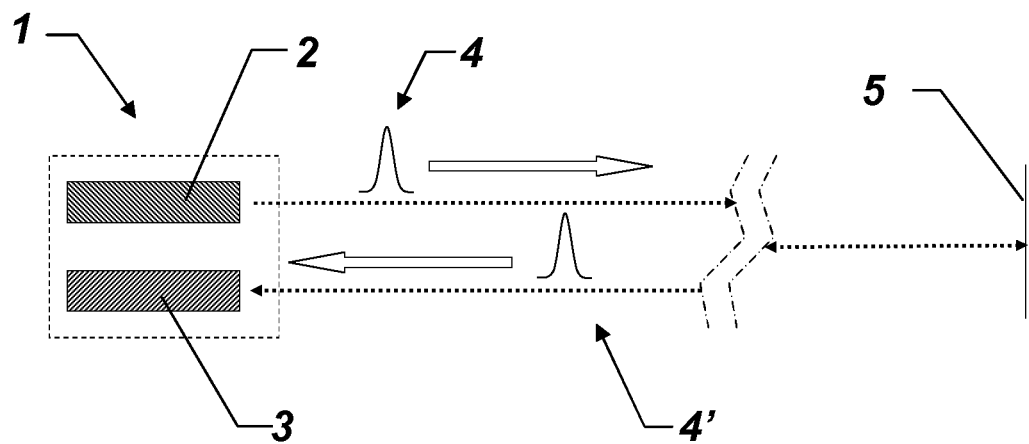
FIGS. 1a, b: show schematic illustrations of the pulse runtime method in an electrooptical distance measuring device according to the prior art.
Figure 1B:
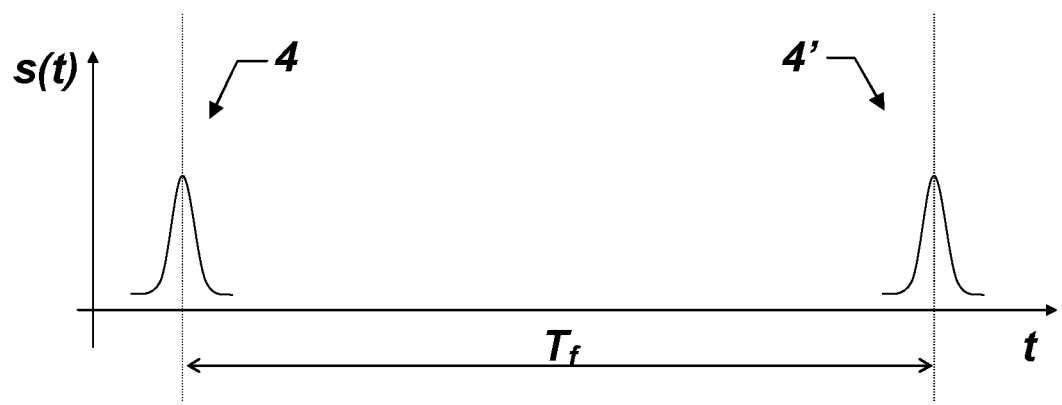

FIGS. 1a and 1b illustrate the pulse runtime principle as is used in typical electrooptical distance measuring devices according to the prior art.

FIG. 1a shows a schematic illustration of an electrooptical distance meter 1 of the prior art according to the pulse runtime principle. A transmitter 2 and a receiver 3 are arranged in the distance meter 1. The transmitter 2 emits a light pulse 4, which, after reflection and/or backscattering on a target, for example, a cooperative target object such as a retroreflector 5 or non-cooperative target object such as a natural surface, is detected again as a backscattered light pulse 4' by the receiver 3. Instead of the light pulses, a continuously modulated transmitted signal is often also used.

As is schematically explained in FIG. 1b, the distance is ascertained from the runtime $T_f$ as the time difference between the starting time of the emission of a light pulse 4 and the receiving time of the backscattered light pulse 4'. The ascertainment of the receiving time is performed in this case by the analysis of a feature of the signal pulse s(t), for example, by way of exceeding a signal threshold or by way of sampling of the signal pulse, wherein after identification of the coding of the associated transmitted signal of a received signal from a defined curve point of the sampled and digitized signal, for example, the inflection points, the curve maxima, or integrally by means of an optimum filter known from time interpolation, a pulse runtime is determined very accurately. A further method for the determination of a defined curve point also comprises, for example, a conversion of the received signal into a bipolar signal and a subsequent determination of the zero crossing.

During the chronologically precise sampling of the backscattered pulse, the electrical signal generated by the detector is converted by means of an analog-digital converter (ADC) into a digital signal sequence, which is subsequently processed further, usually in real time. Due to the use of a variety of sampling sequences and/or summation of the received signal synchronous with the emission rate, a useful signal can also be identified under unfavorable circumstances, so that greater distances or background scenarios which are noisy or subject to interference can also be managed.

Figure 2A:
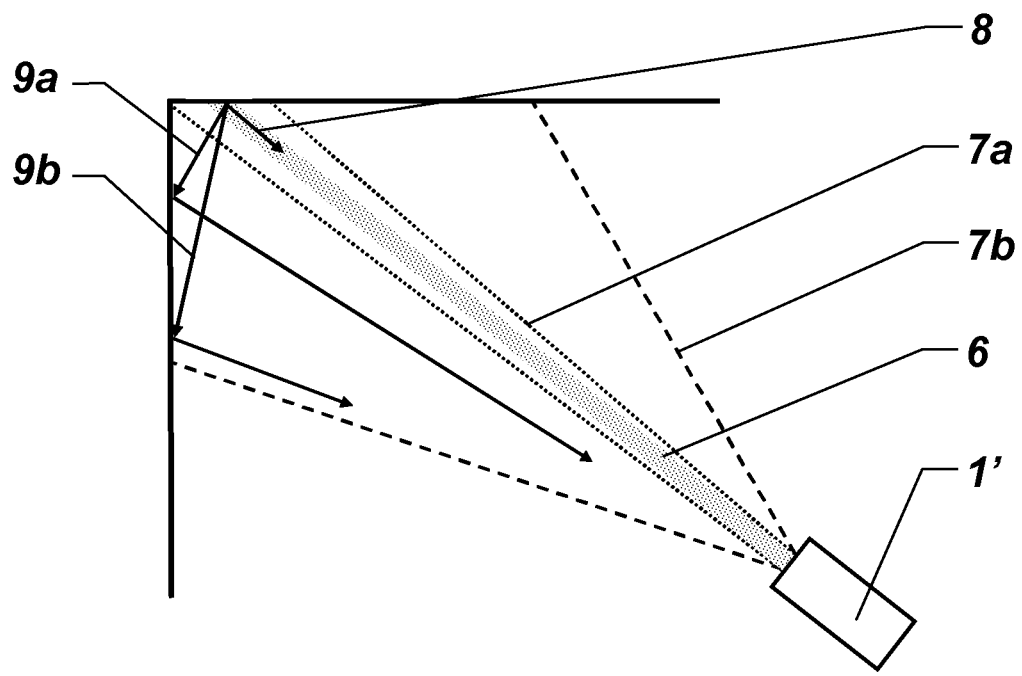
FIGS. 2a, b, c: show exemplary examples of multiple reflections in the scope of distance measurements, for example, in measurements on edges and corners (a), on wet surfaces (b), or measurements on windows (c)
Figure 2B:
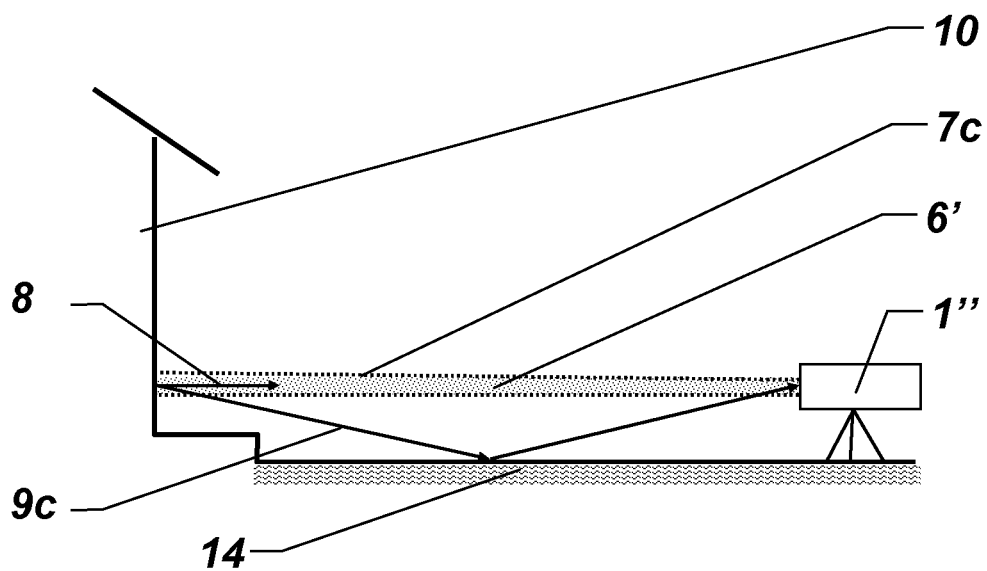
Figure 2C:
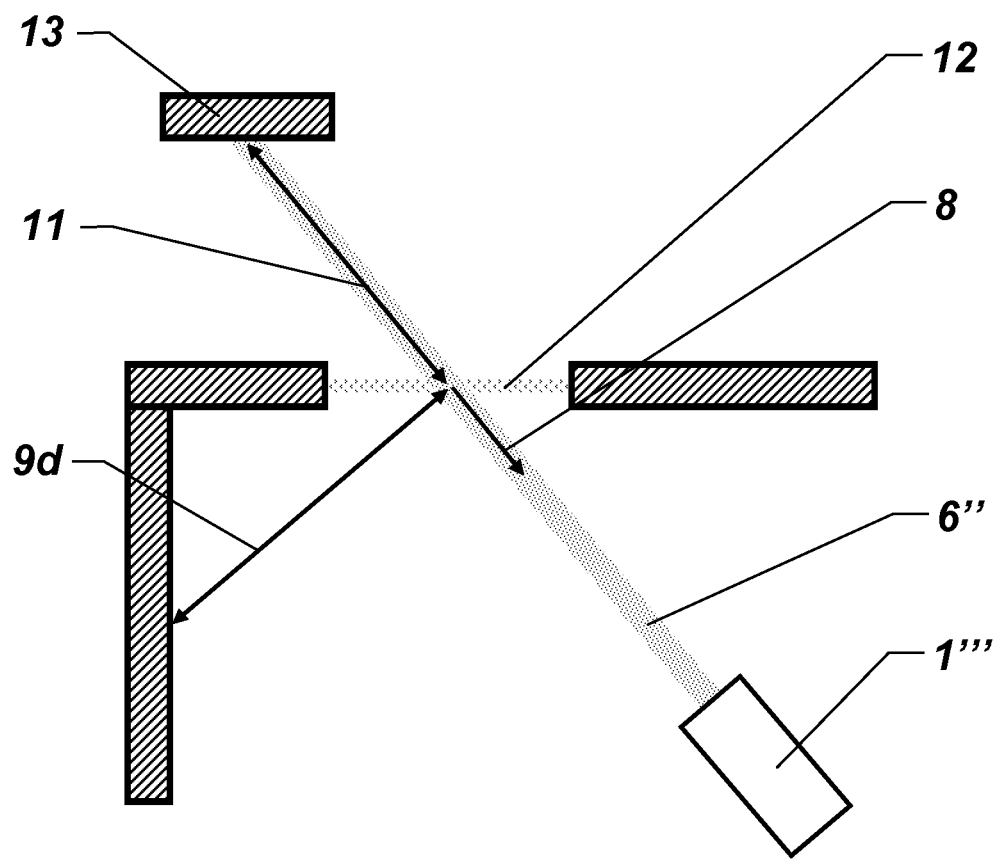

FIGS. 2a, b, c show exemplary examples of multiple reflections in the scope of distance measurements, for example, in the case of measurements on edges and corners (FIG. 2a), so-called stripe measurements, for example, on wet surfaces (FIG. 2b), or measurements on windows (FIG. 2c).

FIG. 2a shows a first example from the prior art, wherein artifacts due to multiple scattering are identified, for example, by means of the WFD principle and multiple measurements using an arrangement of different beam divergences and/or reception FOV angles.

An electrooptical distance meter 1' is designed here in such a way that a transmitted signal is emitted at a defined divergence angle, which is generally as small as possible, essentially shown here as a parallel transmitted beam 6 having constant width. The outer boundaries 7a, b of two different field of vision settings (FOV settings) of a receiver of the distance meter 1' are also indicated. In the ideal case 8, the radiation is backscattered in parallel to the transmitted beam in the direction of the receiver.

Depending on the surface composition and the scattering properties of the surface, for example, caused by the material and the roughness of the surface, the radiation can also be diffusely scattered at the scattering location, however, wherein radiation 9a, b scattered away laterally can also be scattered back to the receiving unit of the distance meter 1' with multiple reflections. These multiple reflections impair the distance measurement and therefore a distance measuring device is generally designed in such a way that a receiving device of the distance measuring device only has a very small field of vision, whereby radiation reflected multiple times is no longer in the field of vision of the distance measuring device.

Further distance meters are known, which identify multiple reflections by means of at least two measurements using settable receiver FOVs of different sizes, based on being able to exclude an influence of obliquely incident scattered beams 9a, b if the respective associated distance for the two field of vision settings of the receiver does not change. However, scattered light reflected backward in the beam path—originally coming from the wall on the left here—also cannot be eliminated using this principle.

According to the present invention, it is ideal in particular if, for example, an arrangement of beam divergences is selected in such a way that a receiving unit has an FOV angle which is somewhat smaller or precisely equal to the divergence of an emitted laser beam as the carrier of the emitted transmitted signal. In this arrangement, remaining interfering multiple reflections can be recognized by means of the WFD principle by way of possible distortions of the signal form, for example, a pulse broadening.

The dimensioning of equal divergences of transmitter and receiver is primarily suitable, however, for slow scanning movements and measurements over short distances. In the case of long distances or rapid scanning movements, in contrast, the divergence of the receiver typically has to be set larger. Moreover, an angled surface, in which one surface reflects strongly, cannot be recognized under certain circumstances by the WFD principle, for example, by means of pulse broadening.

FIG. 2b shows an illustration of an outdoor measurement by means of a distance measuring device 1", for a distance measurement to a house wall 10 here. The distance meter 1" again emits a transmitted beam 6' having a defined beam divergence here. The outer boundary 7c of a receiver FOV, which is selected as small as possible, is also indicated. In particular with this arrangement—for example, remote from edges and corners—the multiple scattering problem can be remedied relatively simply by way of the smallest possible receiver field of vision, i.e., radiation 9c scattered away laterally can be excluded by the narrow receiver field of vision.

However, surfaces are often measured in glancing incidence, thus, for example, roads or wood floors which are located at a greater distance from the measuring instrument. If these objects are wet, for example, a wet road 14 here, a substantial part of the radiation is thus reflected and possibly is incident on an object, for example, a house wall behind it. A reflection to the object located behind it is often also not precluded in the case of dry surfaces.

If the mutual distances are sufficiently large, the objects can thus be separated by means of the WFD principle, wherein the distance sought is generally the shorter measuring distance.

If the objects are very close to one another (less than 1 m but more than 3 cm), at least a pulse broadening is thus detected by means of WFD. This can occur, for example, when measuring a point on the ground close to a wall, wherein a part of the laser radiation is reflected on the ground and is incident on the wall. By means of WFD analysis, for example, on the basis of a pulse broadening, this situation is recognized, however, and the flawed measurement is discarded.

Small distances between irradiated target objects, typically distances less than approximately 3 cm, are problematic, however, and can only be identified with difficulty by means of WFD analysis, not to mention compensating for or remedying them. With the aid of a polarization identifier or a polarization analysis according to the present invention, in contrast, such multiple reflections can be recognized and flawed measurements can be discarded.

For example, targeting of an object in glancing incidence with dry or wet surfaces has a relatively low degree of polarization, if no metallic glossy object is located behind it.

FIG. 2c shows a further possible occurrence of multiple reflections and incorrect measurements of a distance measuring device 1''', triggered here, for example, by reflections occurring on windows 12 and objects 13 located behind them.

The distance meter 1''' again emits a preferably collimated transmitted beam 6'' here having a specific beam divergence defined by diffraction. On the one hand, radiation 9d which is scattered away laterally or reflected also again occurs here, which can be at least partially excluded by a narrow receiver field of vision.

In contrast, if the beam 9d is incident on the light surface, a part of the radiation scattered on this further surface can be reflected back in the incident direction and conducted via the window 12 to the receiver of the distance meter. This further target is recognized by the WFD and the accurate distance is ascertained, but this foreign target object is associated with the angle direction of the transmitted laser beam, which is not correct. This incorrect reflection can also be recognized, however, by the method according to the invention from its polarization signature and therefore eliminated, a time-resolved polarization determination by means of the received signals detected by the WFD is necessary in this case. The photo or avalanche diodes associated with the polarization-sensitive channels are each analyzed by an electronic WFD circuit, for example, whereby at least one Stokes parameter is associated with each received signal. In this case, because of the reflection on the windowpane, the p polarization of the radiation of the incorrect reflection occurs more strongly than the s polarization and the power ratio $I_x/I_y$, or in Stokes notation $S1_x/S1_y$, deviates from 1 and can be compared to a threshold value.

Furthermore, a part of the light 11 is transmitted through the window 12, of which at least a part is again backscattered by an object 13 located behind it substantially in parallel or coaxially in relation to the transmitted beam direction to the distance meter 1′″. This reflection is added as the third target object to the angle direction of the transmitted laser beam and is entirely intentional and correct. However, for example, if the partial distance between the window 12 and the object 13 located behind it is approximately equally as long as the partial distance of radiation 9d which is laterally scattered away or reflected, associated reflected received signals are thus superimposed, whereby the ascertained distance is corrupted. However, possible distortions of the signal form, such as a pulse broadening, can be recognized by means of the WFD principle and the corresponding reflections can be eliminated. However, if the difference between the partial distances is excessively small, for example, less than approximately 3 cm, the pulse broadening analysis of the WFD thus fails, but the received signal can nonetheless be recognized according to the method according to the invention because of the extraordinary polarization signature.

Figure 3:
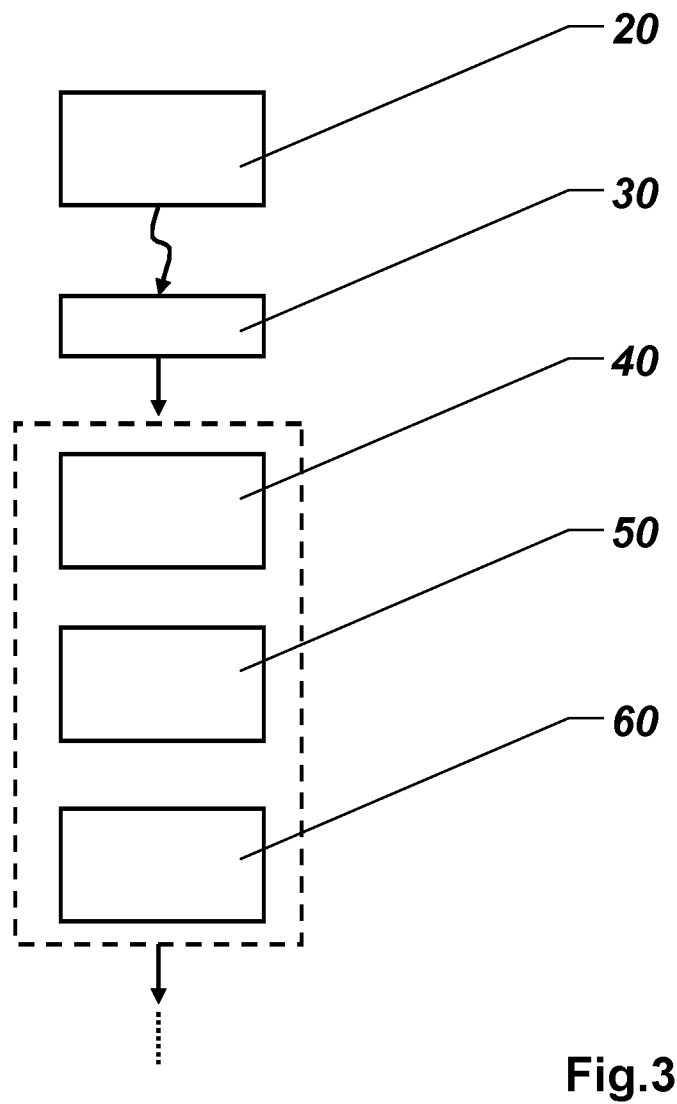
FIG. 3: shows a schematic block diagram of the signal and data analysis for the remedying according to the invention of artifacts due to multiple reflections.

FIG. 3 shows a schematic block diagram of the signal and data analysis for the remedying according to the invention of artifacts due to multiple reflections on the basis of polarization identifiers and/or a complete polarization analysis.

A target object is irradiated 20 using a transmitted signal in a defined polarization state, in particular wherein the at least one polarization identifier of the polarization state of the transmitted signal is known, for example, by emitting x and/or y polarized radiation or right-polarized and/or left-polarized radiation. In this case, the emission of the polarization state can be performed, for example, chronologically separated firstly in the x direction and subsequently in the y direction. Preferably, purely linear and/or circular polarization states such as x linear polarized, y linear polarized, right-circular polarized, left-circular polarized are emitted. However, any polarization states describable using the Stokes vector formalism can be emitted and used.

The generation of two polarization states can be performed, for example, by two laser arrangements, wherein one laser is polarized in the x direction and the other laser is polarized in the y direction. The lasers can then emit pulses in alternating sequence, which are used for distance measuring and receiver-side polarization analysis. The two lasers can also have slightly different wavelengths, in this case an optically-spectrally selective receiver arrangement would suggest itself.

If the transmitting unit codes and emits more than one polarization state, a receiving unit 30 can be equipped, for example, without any possible polarization analysis functionality. Paired with a polarization-selective transmitting unit as described above, for example, a chronologically varying intensity with respect to radiation of different polarization directions emitted at various times can be measured and therefore a polarization identifier of the polarization state of the received signal can be derived. However, transmitting unit and receiving unit are preferably equipped with polarization-coding or polarization-analyzing elements, respectively.

Furthermore, for example, a WFD analysis 40 is performed, for example, with respect to degree of reflectivity of a surface and/or an identification of a pulse broadening.

In particular, for example, an arrangement of beam divergences is ideal such that a receiving unit has an FOV angle which is somewhat smaller or precisely equal to the divergence of an emitted laser beam as the carrier of the emitted transmitted signal. In this arrangement, remaining interfering multiple reflections can be recognized by means of the WFD principle due to possible distortions of the signal form, for example, a pulse broadening.

If the distances associated with two simultaneously irradiated objects are sufficiently far away from one another with respect to the measuring distance, the acquired signal pulses are thus chronologically separable in the receiving unit, but are not yet unambiguously resolved. Thus, for example, reflections can occur on metal pipes or windowpanes, wherein objects can be reflected in the spatial measuring direction. Moreover, for example, in the case of angled target objects having a strongly reflective surface, a pulse broadening often cannot be recognized.

To resolve such artifacts, for example, a further analysis step 50 is performed, wherein in particular a measured power ratio between two beams emitted with different polarization and backscattered is analyzed, in particular two emitted beams having complementary polarization states, for example, linearly polarized radiation respectively in the x and y direction or left-polarized and right-polarized radiation.

Depending on the surface and scattering properties, for example, the intensities ($I_x$, $I_y$) associated with the x and y polarized emissions are almost equal. In contrast, if the measured power ratio $I_x/I_y$, or $S1_x/S1_y$, exceeds a certain threshold value, for example, 3, a multiple scattering can thus be derived, for example, from more than one surface or a surface having structure, for example, a brushed metal surface.

In a simplified embodiment of the invention, in particular the emission of a second polarization state of the laser source could also be omitted.

Finally, in a next step 60, a polarization analysis, for example, an ascertainment of the complete (DOP) or partial (DOLP, DOCP, . . . ) polarization state of the received radiation can be performed, wherein a result of a distance measurement is judged and evaluated depending on the acquired or derived, respectively, polarization state, in particular with respect to multiple reflections on different surfaces.

For example, in the case of a very small degree of polarization of the received radiation of, for example, DOP<20%, multiple reflections are very probable and the distance measurement is discarded. Instead of a determination of the complete degree of polarization, the degree of linear polarization can be ascertained in a simplified manner, for example, wherein, for example, at values of DOLP<15%, the distance measurement is generally corrupted by optical artifacts.

In the case of received radiation having a very high degree of polarization, for example, greater than 65%, for example, a glossy surface is to be presumed. If, for example, a single target object without pulse broadening is derived by means of the waveform digitizing unit, the distance measurement is then highly probably correct and sufficiently accurate. If in contrast two target objects are derived by means of the waveform digitizing unit, for example, wherein the more remote one is occupied with a high degree of polarization >65%, it can then be a target object reflected on the measurement direction and the distance measurement of the more remote object is discarded, for example.

The artifacts generated by multiple scattering can be almost arbitrarily closely delimited and eliminated by means of the polarization identifiers derived from the polarization analysis, such as the degrees of polarization, the angles of polarization, the power ratios $I_x/I_y$, or $S1_x/S1_y$, and the associated threshold values.

In particular, it is to be noted here that not all of the above-mentioned analysis steps 40, 50, 60 necessarily have to be carried out at all or even in the sequence. Rather, they form separate analysis tools for improved identification and/or compensation of distance measuring artifacts as a result of multiple reflections.

Figure 4A:
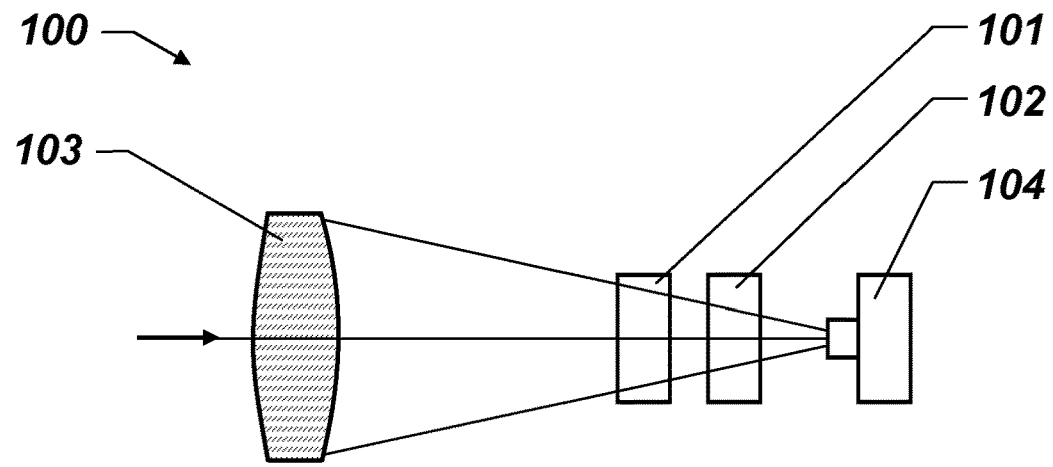
FIGS. 4a, b: show typical embodiments of a receiving unit for determining a polarization identifier or a polarization state of received radiation.

FIGS. 4a, b show two typical embodiments of a receiving unit for determining a polarization identifier or a polarization state of received radiation. In general, a complete polarization measurement is performed by means of a measurement of the backscattered radiation in at least four (sequential or parallel) steps, i.e., a measurement without filter, a measurement with the first linear polarizer, a measurement with a linear polarizer rotated by 45° in relation to the first linear polarizer, and a measurement with a circular polarizer. The four Stokes parameters may be derived therefrom, for example:

$$S1=I_1-I_p+I_s, S2=I_p-I_s, S3=I_{+45}-I_{-45}, S4=S_R-S_L.$$

FIG. 4a, for example, shows an embodiment of a receiving unit 100 by means of an electrically controllable electrooptical or acoustooptical delay element 101, for example, a ferroelectric liquid crystal (FLC), and a polarizer 102, usually called an analyzer in use. A general entry optical unit 103 is also indicated. As in a distance meter, an avalanche photodetector (APD) or an SiPM array detector (silicon photomultiplier), or also a photodiode array or a CCD or a CMOS camera can be used as the detector 104.

Figure 4B:
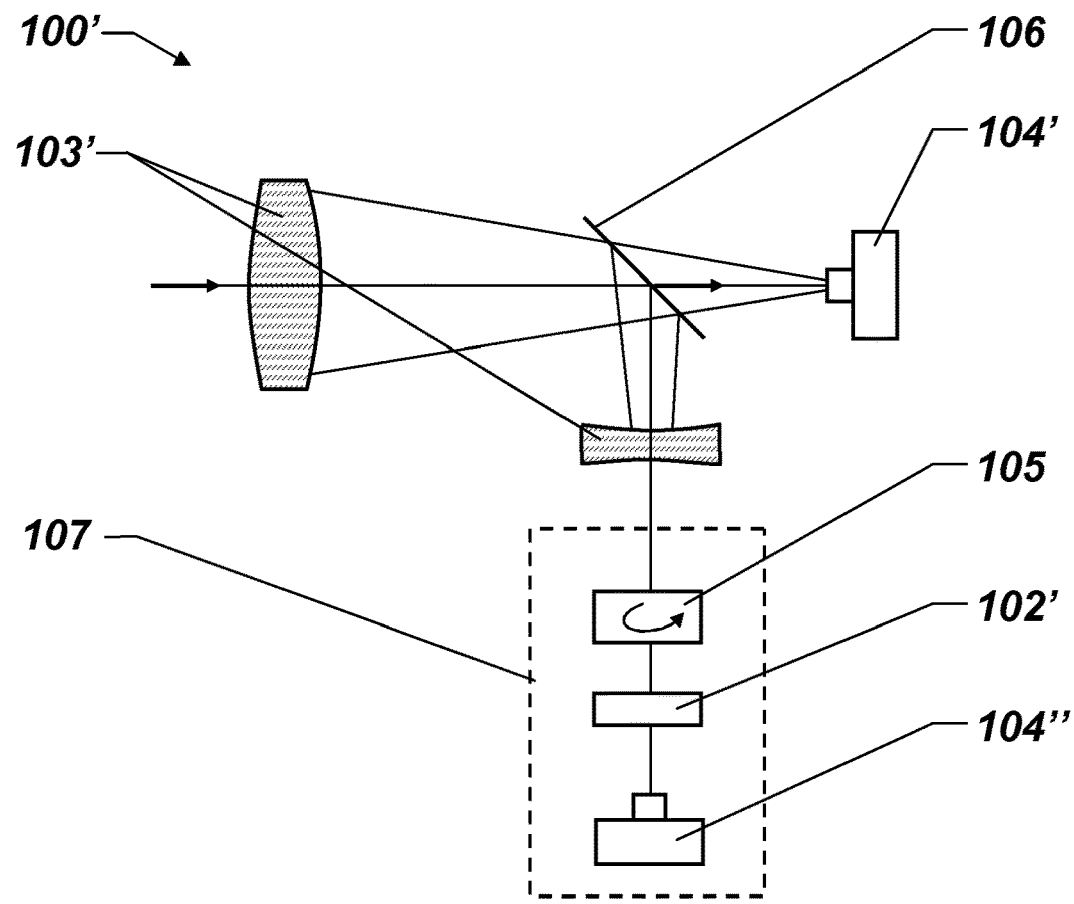

Another method and embodiment of a corresponding receiving unit 100', as shown in FIG. 4b, is to use a rotating phase delay plate 105, for example, a quarter-wave delay plate, again in combination with an analyzer 102', in particular a linear or circular polarizer. During the rotation of the plate, the received power is measured after the analyzer and determined, for example, by means of a transformation of the Stokes vectors derived from the Müller matrices, in particular from frequency, phase, and amplitude of the signal generated using the phase plate.

The figure furthermore shows a general entry optical unit or collimation optical unit 103', respectively, and also, for example, a deflection element 106, for example, a semitransparent mirror or a beam splitter cube. By way of a beam deflection, for example, a channel having a separate detector 104' can only be used for intensity and/or WFD analysis for the signal form and distance measuring, while in contrast a separate optical channel 107 having a further detector 104" can be used for a polarization analysis.

The optical channel 107 can also be constructed from two parallel channels having static, i.e., nonrotating elements, wherein one channel analyzes the linear polarization which is aligned in parallel with respect to the transmitted light and the other channel analyzes another linear polarization, for example, the polarization tilted by 45°. If the two polarization-selective channels are additionally also each provided with a picosecond-speed detector, the distance can thus be measured and the respective polarization can be unambiguously associated with the pulses simultaneously.

It is also to be noted here that the figure only illustrates one scheme and the optical design should be adapted if necessary with respect to a suitable beam deflection for the polarization measurement—for example, no large deflection angles or a combination with further optical elements.

Alternatively, the separate optical channel for the polarization analysis can also be divided, for example, into further separate channels each having corresponding analyzers, for example, a first linear polarizer, a linear polarizer rotated by 45° in relation to the first polarizer, and a circular polarizer.

So-called Stokes cameras are also known, wherein the required polarization filters are arranged in a matrix structure above the pixels, whereby the cameras also register the polarization state of the received radiation in addition to the intensity image.

In the case of spectrally narrowband radiation or with the aid of spectral filters, for example, diffraction gratings, polarimeters based on the principle of the Savart plate interferometer, the Wollaston polarimeter, or also the Sagnac interferometers are also suitable for efficient beam analysis, i.e., general measurements, wherein the polarization states are divided by means of a polarization modulator and/or a polarizing beam splitter and prepared by further elements such as phase plates and analyzers and supplied to photodetectors or cameras.

Figure 5A:
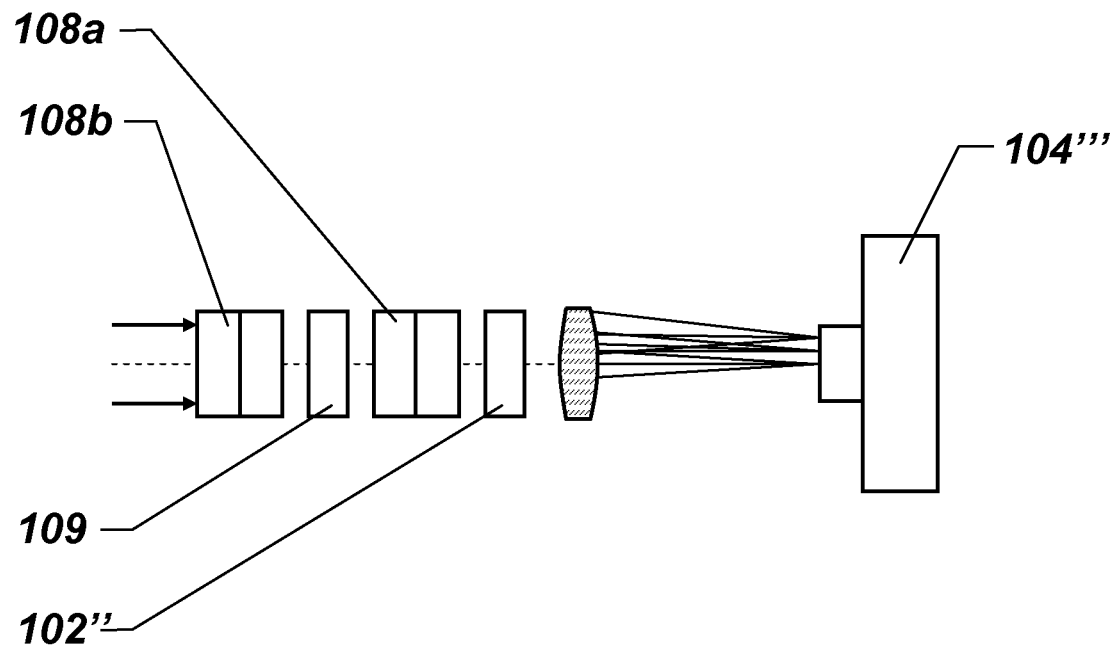
FIGS. 5a, b: show an exemplary polarimeter structure for an instantaneous polarization measurement based on a combination of two Savart plates.
Figure 5B:
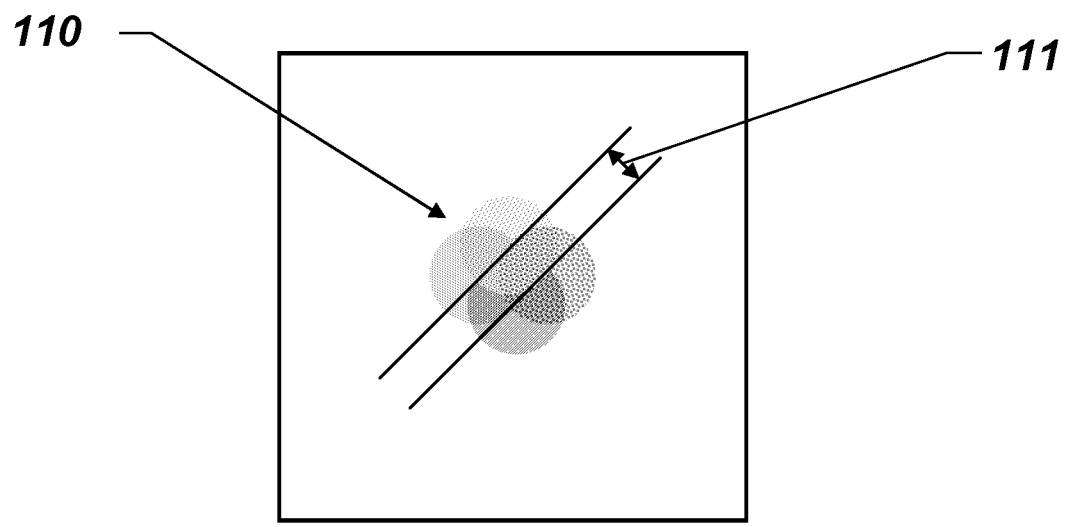

A further exemplary polarimeter structure based on a combination of two Savart plates 108a, b, having a half-wave delay plate 109, a linear polarizer at 45° as an analyzer 102", and a detector 104'" is shown in FIG. 5a. A Savart plate splits an incoming beam into its complementary (linear) polarization components ("ordinary beam" and "extraordinary beam"), wherein one beam (extraordinary beam) is offset in parallel in relation to the other beam. By way of appropriate combination of two Savart plates, an incoming beam can therefore be divided as shown in FIG. 5b into four different partial beams 110 and offset, wherein the Stokes parameters associated with the incident beam can be derived by the lateral offset 111 and by means of Fourier-based image analysis. Thus, for example, an instantaneous polarization measurement can be carried out.

It is obvious that these illustrated figures only schematically illustrate possible exemplary embodiments. The various approaches can also be combined with one another and with methods of the prior art.

What is claimed is:

1. A method of measuring a distance to a target object, the method comprising:
   emitting a transmitted signal in a defined polarization state;
   receiving at least parts of the transmitted signal reflected on the target object as a received signal, wherein the transmitted signal is emitted and the received signal is acquired such that a polarization identifier of the defined polarization state of the transmitted signal adheres to the received signal, wherein the polarization identifier is selected as an indication as to whether the received signal originates from a single reflection or a multiple reflection of the transmitted signal;
   wherein:
   the transmitted signal is emitted as a transmitted signal sequence of individual partial signals, wherein the polarization state of individual partial signals is different,
   a first partial signal of the transmitted signal is emitted in a defined first polarization state,
   a second partial signal of the transmitted signal is emitted in a defined second polarization state, at least a portion of the first partial signal reflected on the target object is acquired as a first received partial signal and at least a portion of the second partial signal reflected on the target object is acquired as a second received partial signal, a first intensity of at least a part of the first received partial signal is measured, a second intensity of at least a part of the second received partial signal is measured, and based on the first intensity and the second intensity, a first comparison value is derived, based on the first comparison value, deriving an evaluation of the received signal is derived; and processing the received signal to derive the distance to the target object therefrom based on the evaluation of the received signal.

2. The ng method according to claim 1, wherein the first and the second partial signals are emitted as completely linearly polarized radiation or circularly polarized radiation.

3. The method according to claim 1, wherein the polarization state of individual partial signals is changed during the determination of the distance according to a defined chronological sequence.

4. The method according to claim 1, wherein the received signal is analyzed by means of waveform digitization.

5. The method according to claim 1, wherein:

the first partial signal of the transmitted signal is emitted as completely linearly polarized radiation or completely circularly polarized radiation, and the second partial signal of the transmitted signal is emitted as completely polarized radiation having a polarization state orthogonal in relation to the first partial signal.

6. The method of claim 5, wherein:

a third partial signal of the transmitted signal is emitted as completely linearly polarized radiation or completely circularly polarized radiation, a fourth partial signal of the transmitted signal is emitted as completely polarized radiation having a polarization state orthogonal in relation to the third partial signal, at least a portion of the third partial signal reflected on the target object is acquired as a third received partial signal and at least parts of the fourth partial signal reflected on the target object is acquired as a fourth received partial signal, a third intensity of at least a part of the third received partial signal is measured using a first polarization analyzer, a fourth intensity of at least a part of the fourth received partial signal is measured using a second polarization analyzer, based on the third intensity and the fourth intensity, a second comparison value is derived, and the second comparison value is taken into consideration for an evaluation of the third and/or fourth received partial signal.

7. The method of claim 5, wherein the first or second comparison value are compared to a first or second threshold value, respectively, based on a set of defined scattering properties representative of at least one target object, based on at least one element of the following group:

a geometrical surface structure,
a surface porosity,
albedo properties,
reflection properties,
absorption properties,
and phase properties.

8. The method of claim 1, wherein:

at least one polarization identifier of the transmitted signal is known, at least one polarization identifier of the received signal is derived based on the at least one polarization identifier of the transmitted signal or the at least one polarization identifier of the received signal, at least one evaluation parameter of the following group is derived:

a degree of polarization (DOP) of the received signal,
an angle of polarization of the received signal,
a depolarization factor between transmitted signal and received signal, wherein the at least one evaluation parameter is taken into consideration for the evaluation of the received signal during the processing of the received signal to determine the distance to the target object.

9. A distance measuring module for determining a distance to a target object, the distance measuring module comprising:

a transmitting unit for emitting a transmitted signal;

a receiving unit for receiving at least parts of the transmitted signal reflected on the target object as a received signal; and a monitoring and control unit for processing the received signal to derive the distance to the target object therefrom, wherein:

the transmitting unit and the receiving unit are configured such that:

the transmitted signal is emitted in a defined polarization state, and the transmitted signal is emitted and the received signal is acquired such that a polarization identifier of the polarization state of the transmitted signal adheres to the received signal, wherein the polarization identifier is selected so that it is an indication for whether the received signal originates from a single reflection or a multiple reflection of the transmitted signal, wherein the transmitted signal is emitted as a transmitted signal sequence of individual partial signals, wherein the polarization sttae of individual partial signals is different, at least a portion of the first partial signal reflected on the target object is acquired as a first received partial signal and at least a portion of the second partial signal reflected on the target object is acquired as a second received partial signal, a first intensity of at least a part of the first received partial signal is measured, a second intensity of at least a part of the second received partial signal is measured, based on the first intensity and the second intensity, a first comparison value is derived, and an evaluation of the received signal is derived by the monitoring and control unit based on the first comparison value, and is taken into consideration during the processing of the received signal to determine the distance to the target object.

10. The distance measuring module of claim 9, wherein the transmitting unit is configured such that the transmitted signal is emitted as a transmitted signal sequence of individual partial signals, wherein the polarization state of individual partial signals is changed in the scope of the determination of the distance according to a defined chronological sequence.

11. The distance measuring module according to claim 9, wherein the monitoring and control unit is configured such that the received signal is analyzed by means of waveform digitization.

12. The distance measuring module according to claim 9, wherein the distance measuring module is configured such that:
- the first partial signal of the transmitted signal is emitted as completely linearly polarized radiation or completely circularly polarized radiation,
- the second partial signal of the transmitted signal is emitted as completely polarized radiation having a polarization state orthogonal in relation to the first partial signal,
- the first comparison value is taken into consideration for an evaluation of the first and/or second received partial signal.

13. The distance measuring module according to claim 12, wherein the distance measuring module is configured such that:
- a third partial signal of the transmitted signal is emitted as completely linearly polarized radiation or completely circularly polarized radiation,
- a fourth partial signal of the transmitted signal is emitted as completely polarized radiation having a polarization state orthogonal in relation to the third partial signal,
- at least a portion of the third partial signal reflected on the target object is acquired as a third received partial signal and at least parts of the fourth partial signal reflected on the target object is acquired as a fourth received partial signal,
- a third intensity of at least a part of the third received partial signal is measured using a first polarization analyzer,
- a fourth intensity of at least a part of the fourth received partial signal is measured using a second polarization analyzer,
- based on the third intensity and the fourth intensity, a second comparison value is derived, and
- the second comparison value is taken into consideration for an evaluation of the third and/or fourth received partial signal.

14. The distance measuring module according to claim 12, wherein the first or second comparison value are compared to a first or second threshold value, respectively, based on a set of de-fined scattering properties representative of at least one target object, based on at least one element of the following group:
- a geometrical surface structure,
- a surface porosity,
- albedo properties,
- reflection properties,
- ab-sorption properties,
- and phase properties.

15. The distance measuring module according to claim 9, wherein the distance measuring module is configured such that:
- at least one polarization identifier of the transmitted signal is known,
- at least one polarization identifier of the received signal is derived based on the at least one polarization identifier of the transmitted signal or the at least one polarization identifier of the received signal,
- at least one evaluation parameter of the following group is derived:
  - a degree of polarization (DOP) of the received signal,
  - an angle of polarization of the received signal,
  - a depolarization factor between transmitted signal and received signal,
- wherein the at least one evaluation parameter is taken into consideration for the evaluation of the received signal during the processing of the received signal to determine the distance to the target object.

16. A distance measuring module for determining a distance to a target object, the distance measuring module comprising:
- a transmitting unit for emitting a transmitted signal;
- a receiving unit for receiving at least parts of the transmitted signal reflected on the target object as a received signal; and
- a monitoring and control unit for processing the received signal to derive the distance to the target object therefrom;

wherein
the transmitting unit and the receiving unit are configured such that:
- the transmitted signal is emitted in a defined polarization state, and
- the transmitted signal is emitted and the received signal is acquired such that a polarization identifier of the polarization state of the transmitted signal adheres to the received signal, wherein the polarization identifier is selected so that it is an indication for whether the received signal originates from a single reflection or a multiple reflection of the transmitted signal, and an evaluation of the received signal is derived by the monitoring and control unit based on the polarization identifier, and is taken into consideration during the processing of the received signal to determine the distance to the target object, wherein the distance measuring module is configured such that:
- at least one polarization identifier of the transmitted signal is known,
- at least one polarization identifier of the received signal is derived based on the at least one polarization identifier of the transmitted signal or the at least one polarization identifier of the received signal,
- at least one evaluation parameter of the following group is derived:
  - a degree of polarization (DOP) of the received signal,
  - an angle of polarization of the received signal,
  - a depolarization factor between transmitted signal and received signal,
- wherein the at least one evaluation parameter is taken into consideration for the evaluation of the received signal during the processing of the received signal to determine the distance to the target object.

* * * * *